United States Patent
Attey

(10) Patent No.: US 9,016,779 B2
(45) Date of Patent: Apr. 28, 2015

(54) BICYCLE OR RIDE ON VEHICLE SEATS AND SADDLES

(75) Inventor: Graeme Scott Attey, South Fremantle (AU)

(73) Assignee: Fuselage Design Pty Ltd, Fremantle (AU)

( * ) Notice: Subject to any disclaimer, the term of this patent is extended or adjusted under 35 U.S.C. 154(b) by 0 days.

(21) Appl. No.: 14/122,859

(22) PCT Filed: May 30, 2012

(86) PCT No.: PCT/AU2012/000601
§ 371 (c)(1),
(2), (4) Date: Dec. 5, 2013

(87) PCT Pub. No.: WO2012/162735
PCT Pub. Date: Dec. 6, 2012

(65) Prior Publication Data
US 2014/0110980 A1    Apr. 24, 2014

(30) Foreign Application Priority Data

May 30, 2011 (AU) ................................ 2011902104
Sep. 23, 2011 (AU) ................................ 2011903934

(51) Int. Cl.
*B62J 1/02* (2006.01)
*B62J 1/00* (2006.01)

(52) U.S. Cl.
CPC ...... *B62J 1/02* (2013.01); *B62J 1/00* (2013.01)

(58) Field of Classification Search
CPC .................. B62J 1/02; B62J 1/00; B62J 1/10; B62J 1/005
USPC .......................................... 297/197, 204, 205
See application file for complete search history.

(56) References Cited

U.S. PATENT DOCUMENTS

| | | | | |
|---|---|---|---|---|
| 578,426 A | * | 3/1897 | Smith ............................ | 297/197 |
| 606,146 A | * | 6/1898 | Hunt .............................. | 297/197 |
| 607,181 A | * | 7/1898 | Phillips ..................... | 248/295.11 |
| 618,613 A | | 1/1899 | Pedersen | |
| 672,656 A | * | 4/1901 | Tillinghast ..................... | 297/207 |
| 5,340,192 A | * | 8/1994 | Hsh ................................ | 297/197 |
| 5,597,202 A | * | 1/1997 | Andersen ................... | 297/195.1 |
| 6,666,507 B1 | * | 12/2003 | Ringgard .................... | 297/195.1 |

* cited by examiner

*Primary Examiner* — Sarah B McPartlin
(74) *Attorney, Agent, or Firm* — Cascio & Zervas

(57) ABSTRACT

A seat (10, 20, 30, 70, 80, 90, 110) of a manual or powered ride on vehicle, the seat including at least one resilient elastomeric web seat portion (4, 24, 34, 78, 94, 114) suspended in tension between first (5, 25, 79a, 119) and second (6, 26, 78, 79b, 87,118) supports, the suspended web(s) supporting a rider when sat on by the rider with the elastomeric web(s) resiliently stretching with increasing reactive tension under rider weight to react rider weight and give elastomeric tension seat support to the rider.

15 Claims, 7 Drawing Sheets

BICYCLE OR RIDE ON VEHICLE SEATS AND SADDLES

TECHNICAL FIELD

The present invention relates to bicycle or ride on vehicle seats and saddles, such as for bicycles (bikes) and powered vehicles including electrically powered bikes (e-bikes).

BACKGROUND

The following background will be described in relation to pedal bicycles. However, the same issues arise in relation to other manual or powered 'ride on' vehicles. 'Ride on' vehicles are those vehicles where a rider sits perched on or astride a seat/saddle, rather than in a seat, such as in a car seat.

Conventional bicycle seats/saddles are well known for discomfort. While professional or serious amateur cyclists attempt to reduce the problem using padded shorts, the average or casual cyclist relies entirely on the cushioning properties of the seat to provide comfort.

Conventional bicycle seats or saddles consists of cushioned foam, leather and/or springs to provide comfort. However, no matter what the design or construction method of conventional bicycle seats, they are all based on the principle of compression cushioning. In other words, when a rider sits on the seat the springs and/or cushioning foam material are compressed by the rider's weight. The comfort is therefore provided by the cushioning properties (usually dictated by thickness and density of the cushioning material) of the seat material under compression.

A common attempt for improved comfort is for cyclists to use a padded or gel filled seat/saddle cover to alleviate such discomfort from the seat/saddle. However, this requires purchase of an additional cover, thereby adding to the overall cost and weight of the seat/saddle. Also, over time the padding/gel losses its effectiveness, or after a long ride the seat/saddle becomes uncomfortable regardless of the cover.

Both men and women are often loathe to ride cycles because of the lack of seat/saddle comfort. Knowing how sore they could become after a cycle ride, potential cyclists can sometimes avoid cycling based on this experience, thereby losing an opportunity for health, fitness and enjoyment.

Poor air circulation is also an issue as conventional seats/saddles usually incorporate smooth areas of padding in contact with the rider, making ventilation relatively poor. While some seats have been designed with a central recessed groove to improve air ventilation, by definition there still needs to be a significant cushioned area in contact with the rider without air circulation.

Regarding the health issues of conventional bicycle seats/saddles, the following problems have been realised. Weight of a person sitting on a normal chair is distributed over a wide surface area. This includes the buttocks and thighs. However, on a bicycle seat or saddle, the person's weight is distributed over a much smaller area. This creates a five or six fold increase in pressure on the crotch. A typical bike seat or saddle concentrates pressure against the perineum. The perineum contains the nerves and arteries to the genitals. This concentration of pressure, especially when the bicycle is used for long periods or the pressure is increased by impact with the seat or saddle when riding over rough ground, can cause physical harm to the rider, and incidents of impotence and sexual dysfunction have been reported. Research has shown that cyclists have four times the rate of impotence compared with track athletes. A 1997 Scandinavian study of cyclists taking part in a several-hundred-mile race found that 13% of riders had at least temporary impotence. The US National Institute for Occupational Safety and Health, known as NIOSH, decided to study numbness and sexual dysfunction in police who use bicycles for patrolling. Researchers studied the quality and duration of night-time erections, a strong indicator of overall sexual health, among 17 bicycle policemen and five men who didn't ride bikes. The study showed that the policemen had erections during 27% of their sleep cycle compared with 43% among non-policemen. In the study, 93% of the policemen said they experienced genital numbness.

One known suspended style seat for bicycles is disclosed in U.S. Pat. No. 618,613 to Pedersen. Strips of material extend longitudinally and have one of their ends all connected to a ring, and the other free ends connected to and spaced along a bar attached to springs. The ring and the springs attach to different parts of the bike frame to provide a suspended seat. Suspension is provided by the springs. The strips of material are prevented from spreading sideways by additional transverse strips of material woven across the longitudinal strips. Thus, the strips of material do not have elastomeric properties and thus do not provide elastic comfort suspension; rather, the springs provide suspension to the seat.

With this in mind, it is desirable of the present invention to provide a ride on seat or saddle giving improved comfort and preferably increased air circulation.

SUMMARY OF THE INVENTION

With the aforementioned in mind, the present invention provides a seat or saddle of a bicycle or ride on vehicle, the seat or saddle including at least one resilient elastomeric web seat portion suspended in tension between first and second supports, the suspended web(s) supporting the rider's effective weight on the seat or saddle, whereby the at least one elastomeric web resiliently stretches under said rider's effective weight with increasing reactive tension until the tension in the elastomeric web balances the rider's effective weight and the rider is supported by the seat or saddle.

Effective weight refers to the portion of the rider's weight on the seat or saddle, which may not be the rider's complete weight. Part of the rider's weight may be supported by pedals/footrests and/or handlebars/steering mechanism. It will be appreciated that the effective rider's weight on the seat or saddle will vary with terrain and shift in weight. Also, effective weight on the seat or saddle will vary with up and down motions. Advantageously, the seat or saddle of the present invention is able to dynamically adjust to the effective weight by increasing reactive tension when the effective weight increases (such as the bike going over a hump at speed), or decreases (such as when the bike drops into a hollow at speed). Beneficially, the elastomer web(s) provides a form of seat suspension for the rider, thereby enhancing comfort and ride enjoyment, as well alleviating the risk of health problems associated with commonly known fixed saddles.

The present invention relates to a new structural approach to ride on seats or saddles based on utilizing at least one suspended web under tension to create a comfortable seat with preferably enhanced air circulation.

The present invention relates to a novel layout for ride on seats where the principle feature is to reverse the normal compression cushioning seat design and instead utilize a suspended flexible web arrangement that flexes down under tension via rider weight, somewhat like a flexible hammock.

The web seat portion of the present invention may include an open mesh or net, such as a regular polygon pattern (e.g. square, rectangular or hexagonal pattern) mesh, or a solid web of elastomer, or combinations thereof. Mesh or net type (open cell) style webs provide enhanced air circulation.

Preferably the elastomer is a urethane elastomer. The elastomer may have a durometer value of 30-120 ShoreA, more preferably between 80 and 95 ShoreA, to provide required elastomeric stretch characteristics with sufficient rider weight support. Example injection moulding grade materials commercially available include BASF Elastollan 1185 and BAYER Desmopan 385S.

More than one web seat portion may be provided between the supports. Multiple webs may be layered one over the other, either attached to one another in a laminated arrangement or unattached to each other and co-suspended between the supports, or a combination of layers of both types.

Thus, a seat or saddle may be provided having multiple layers of elastomeric web, each layer suspended between opposed supports. The supports may be provided on a seat frame.

Preferably the seat or saddle is a bicycle seat or saddle including a frame with attachment portions to retain at least one said web therebetween in tension.

While the web/mesh plus the accompanying base frame of the seat/saddle would normally be produced and sold as a unit in the same way as a conventional bicycle seat, it is possible that the base frame could actually be a part of the bicycle frame itself. In other words, the end supports for the mesh/web could be an actual part of the bicycle frame and not a separate seat/saddle component. In the longer term this is actually the strongest and lightest method of support for the mesh/web, albeit less versatile and adjustable.

The web(s) may include web seat portion attachment portions configured to releasably or permanently engage with corresponding attachment portions on a seat frame. The web seat attachment portions may be moulded into the elastomer, such as by a one piece poured or injection moulded web. Alternatively, the web may be provided with attachment fittings to attach the web to a seat frame or vehicle frame.

Tension and suspension in the seat can be varied by changing the web for a web of different Shore hardness and/or by adding/subtracting webs or varying web length.

Tension adjustment means can also be incorporated into the base frame to increase or decrease tension pre-load on the web/mesh via an adjustable tension system. Thus, the support provided by the seat can be tailored to a particular rider. For example, hooks may be provided on one or more adjusters mounted at a or the respective end of or underneath the seat/saddle to which loops on the ends of the web are removably retained. The hooks may rotated or moved to increase or decrease tension in the web(s). Alternatively, position on the web(s) at which the web(s) is/are retained by retainer(s) on the seat/saddle or frame may be selected, such as various openings enabling a longer or shorter effective web length to be chosen which effects tension in the elastomer.

Webs may be colour coded relating to level of rider support.

BRIEF DESCRIPTION OF THE DRAWINGS

Reference will now be made to the accompanying drawings so that the invention may be more readily understood, in which.

Figure 1:
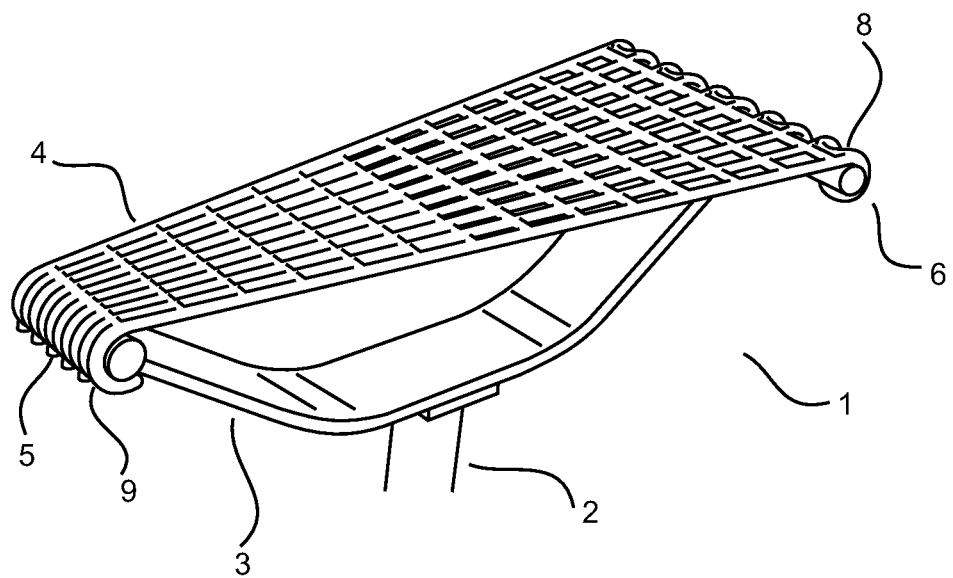
FIG. 1 shows a bicycle seat/saddle according to an embodiment of the present invention.

Various modifications may be made in details of design and construction without departing from the scope or ambit of the present invention.

DESCRIPTION OF PREFERRED EMBODIMENTS

For the sake of convenience, the invention will hereinafter be described in relation to embodiments of the present invention but it is to be understood that the invention is not limited thereto.

The following description uses the term 'seat'. It is to be understood that this term encompasses the term 'saddle' often used in relation to cycles, and interchangeably with the term 'seat'.

The present invention is applicable to, though not limited to, the following ride on vehicles: e-bikes, pedal bicycles, motor scooters, motorcycle seats, motocross bikes and off-road motorcycles, all-terrain vehicle seats such as quad bikes, jet-skis.

Traditional cycle seats use compression cushioning. Instead of using such conventional compression cushioning, the present reverses conventional design by providing a flexible, suspended, elastomeric web placed under tension, in use, from rider weight. This approach results in increased comfort and improved ventilation for the rider.

The principle layout of a seat is an underlying base frame with raised ends over which the seat flexible web seat portion is stretched. The base frame is higher at the front and rear ends so that the flexible web (net or mesh) is stretched between the ends under tension.

When a rider sits on the web, tension is increased and the web flexes down under rider weight. The flex characteristics of the web are designed so that rider weight does not allow the web to flex far enough to touch the base. This effectively means the rider is sitting in a flexible 'hammock' style seat, floating above the frame base.

Of course, should the bicycle hit a large enough bump then the web could flex enough for the web and rider to make contact with the base of the seat frame. In this regard, the top area of the base can be cushioned via conventional padding to absorb extreme impact. However, even if the rider touches the frame base, generally the vast majority of force exerted by the bump is already absorbed by the flexible web so the contact force is very slight.

It is also important to remember that the present invention automatically contours to the individual anatomy of each rider. Because the web/mesh is a flexible elastomer, it naturally conforms to individual body shape, providing riding comfort.

The web or mesh/net stretches over the frame base and can be secured to each end via projections (e.g. knobs) or loops to fit into or over corresponding recesses or lugs respectively designed into the seat frame base. The flexible web/mesh/net can typically be moulded flat via injection moulding and an ideal example material is flexible polyurethane thermoplastic elastomer. The characteristics of this material are a supreme ability to stretch and rebound without deformation.

It is of course possible to use connection methods other than loops over corresponding frame base hooks. Examples such clamps, or knobs and slotted designs and even rotating adjustable systems can be utilized. However, for the purpose of ease of description, the hook method is described herein. The hooks and corresponding knobs can be external or concealed via covers.

It is also possible to incorporate different combinations of seat to suit the market. For example, racing versions could be narrow, small and lightweight while longer and wider versions could be made for super comfort for casual cycling, cruising etc.

Although most examples of the seat described herein incorporate a flat web stretched between base frame end bars, it is possible to also incorporate the same design principles into a 3D design where the web is not flat but curved to more closely replicate a traditional bike seat shape.

The seat mounts to frame seat posts via conventional means so there are no special requirements by way of bicycle or seat post design. The seat can therefore be supplied with new bikes and OEM or retro-fitted to existing bikes.

The present invention is not limited to pedal cycles, such as bicycles. The principles of a seat embodying the present invention can also be incorporated into other related products such as seats on e-bikes, motocross and off-road motorcycles, motor scooters, all-terrain vehicle seats, motorcycle seats, jet-ski seats etc.

The present invention provides a cycle seat with a suspended, hammock style, elastomer web or mesh held under tension for a rider to sit on, instead of a conventional cushioned seat under compression.

FIG. 1 shows a seat 1 with the seat post 2 supporting a flat style example seat frame-base 3, with grid-patterned flexible web in the form of a mesh 4 stretched over the frame-base 3 via connection to the frame-base front section 5 and frame-base rear section 6 using front web hooks 9 and rear web hooks 8 respectively.

Figure 2:
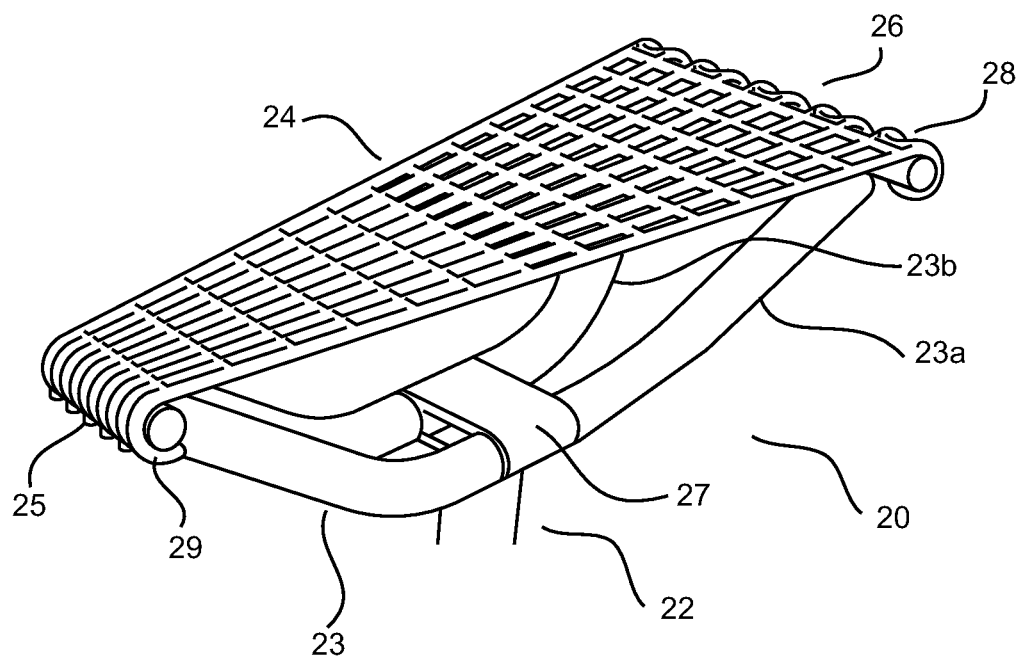
FIG. 2 shows a seat according to a second embodiment of the present invention.

FIG. 2 shows a front perspective view of an alternative embodiment of cycle seat. The seat 20 is shown with the seat post 22 supporting a twin-tube styled example frame-base 23 with frame tubes 23a,23b protected by padding 27, with grid-patterned flexible web/mesh/net 24 stretched over the twin-tubed frame-base 23 via connection to the frame-base front section 25 and frame-base rear section 26 using front web hooks 29 and rear web hooks 28 respectively.

Figure 3:
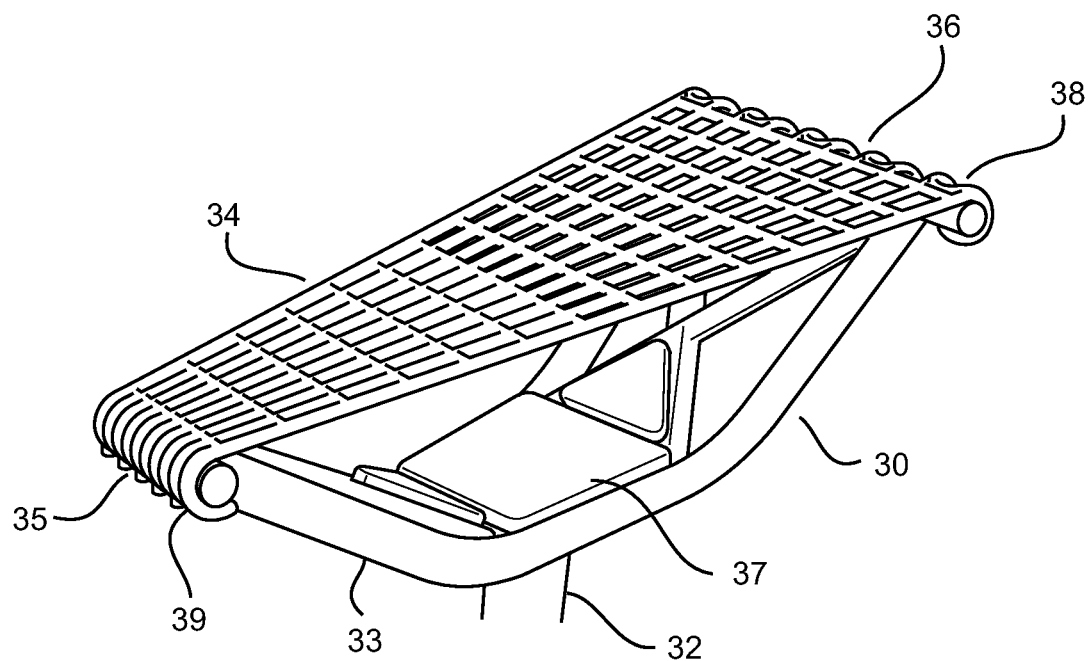
FIG. 3 shows a seat according to a further embodiment of the present invention.

FIG. 3 shows another embodiment of the seat according to the present invention described, being a front perspective view of the seat 30 with the seat post 32 supporting an injection-moulded form frame-base 33 protected by padding 37, with grid-patterned flexible web/mesh 34 stretched over the injection-moulded frame-base 33 via connection to the frame-base front section 35 and frame-base rear section 36 via front web hooks 39 and rear web hooks 38 respectively.

Figure 4:
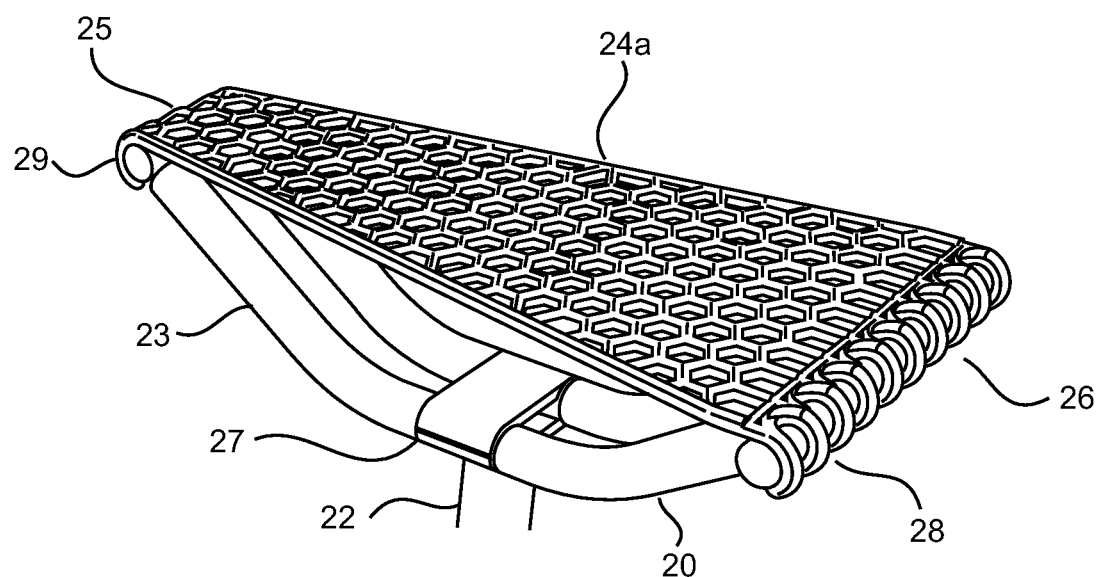
FIG. 4 shows a seat according to the embodiment of the present invention with the seat frame as shown in FIG. 2 but with hexagonal mesh web.
Figure 5:
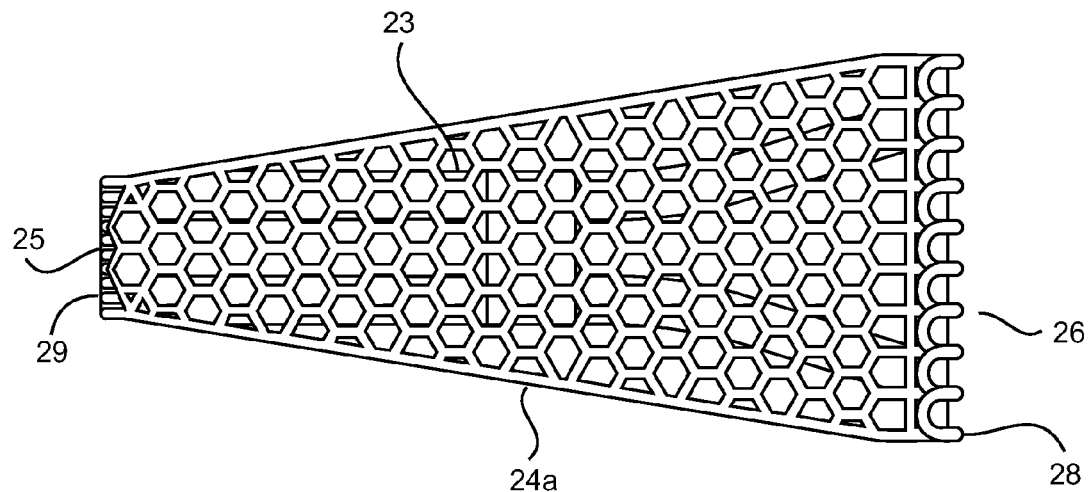
FIG. 5 is a top view of the seat shown in FIG. 4.

FIGS. 4 and 5 show alternative views of an embodiment the present invention. FIG. 4 being a rear perspective view of the seat shown in FIG. 2. FIG. 5 is a top view. The seat 20 is shown with the seat post 22 supporting a twin-tube styled example frame-base 23 protected by padding 27, with hexagonal patterned flexible web/mesh 24a stretched over the twin-tubed frame-base 23 via connection to the frame-base front section 25 and frame-base rear section 26 via front web hooks/loops 29 and rear web hooks/loops 28 respectively.

Figure 6:
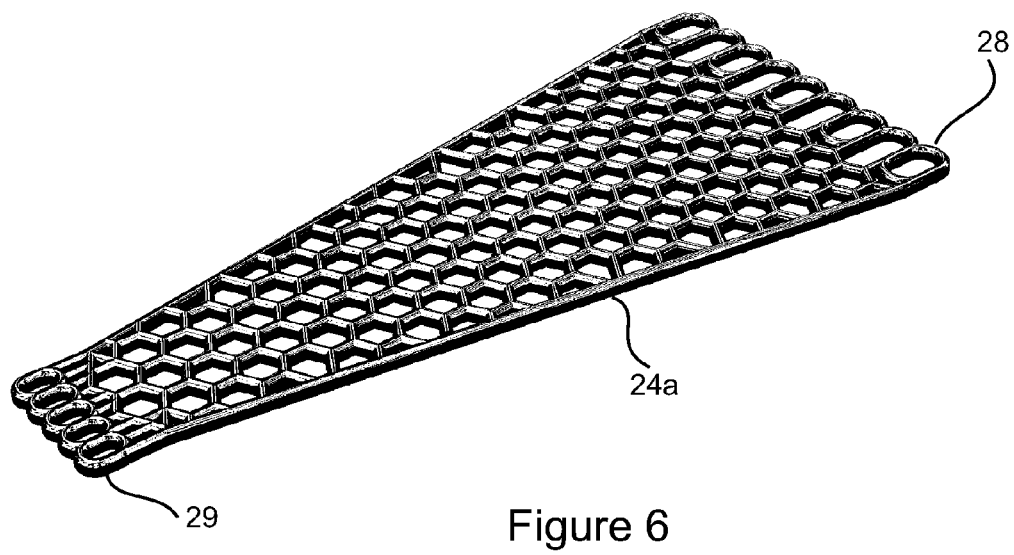
FIG. 6 shows the hexagonal mesh web of FIGS. 4 and 5 in its moulded flat form.

FIG. 6 shows a hexagonal pattern seat web mesh portion 24a as it would be moulded or injection moulded in flat form with front web attachment loops 29 to hook over corresponding projections on the front of the seat frame, and rear web attachment loops 28 to hook over corresponding rear projections on the seat frame. This attachment arrangement requires the web to be stretched over the frame to fit onto the projections and thereby initially tension the web.

Figure 7:
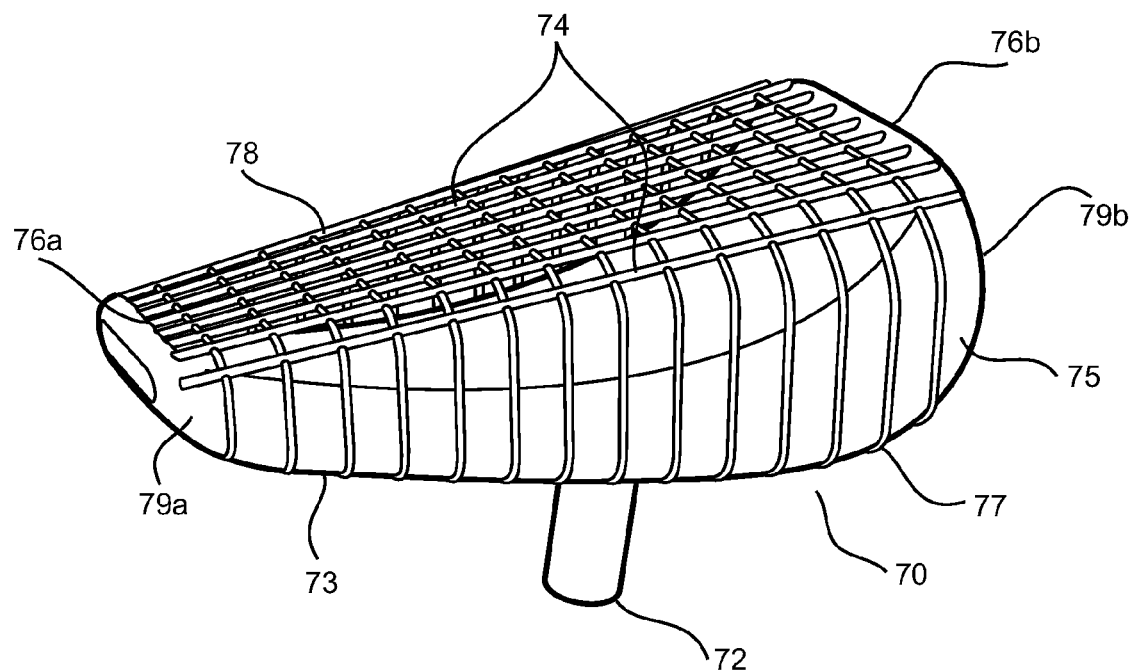
FIG. 7 shows an alternative embodiment of the present invention.

FIG. 7 shows an alternative form of the seat 70 of the present invention where the web is not flat, rather, it is curved to more closely replicate a traditional bike seat shape, showing a perspective view of a rounded web seat 70 with the seat post 72 supporting the seat base 73, with flexible web/mesh 78 stretched over and around the base 73. The seat base has a moulded body 75. The mesh has longitudinal strands 74 extending front to rear across the seat base and transverse strands 77 stabilising those longitudinal strands. The moulded seat body has a rear upstand 79b with grooves, openings, channels or notches 76b to receive and retain the longitudinal strands at the rear of the seat, and a front upstand 79a with grooves, openings, channels or notches 76a to receive and retain the longitudinal strands of the web at the rear front end.

Figure 8:
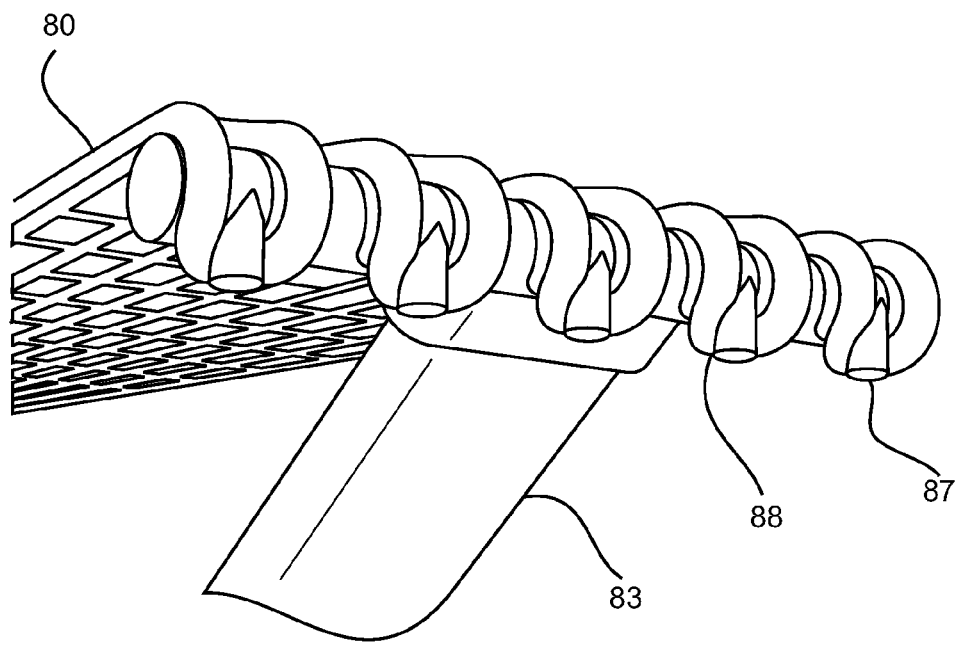
FIG. 8 shows a means of releasably attaching the web to a seat frame according to an embodiment of the present invention.

FIG. 8 shows a portion of a seat 80 with a moulded web seat portion incorporating moulded rear loops 88 stretched and engaged over projection pegs 87 on the seat frame 83.

Figure 9:
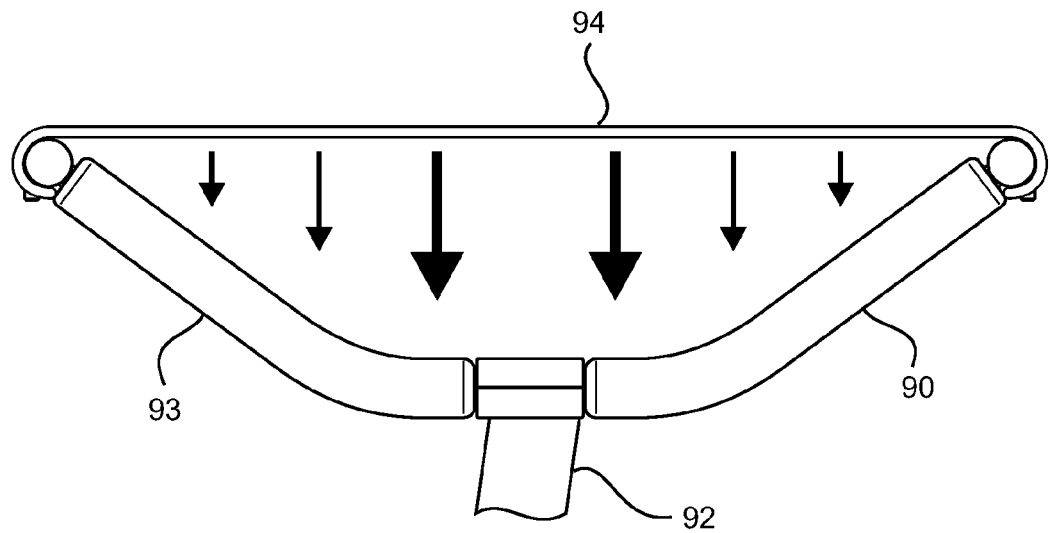
FIG. 9 shows initial downward forces indicated by arrows representing weight of a rider on the suspended seat.
Figure 10:
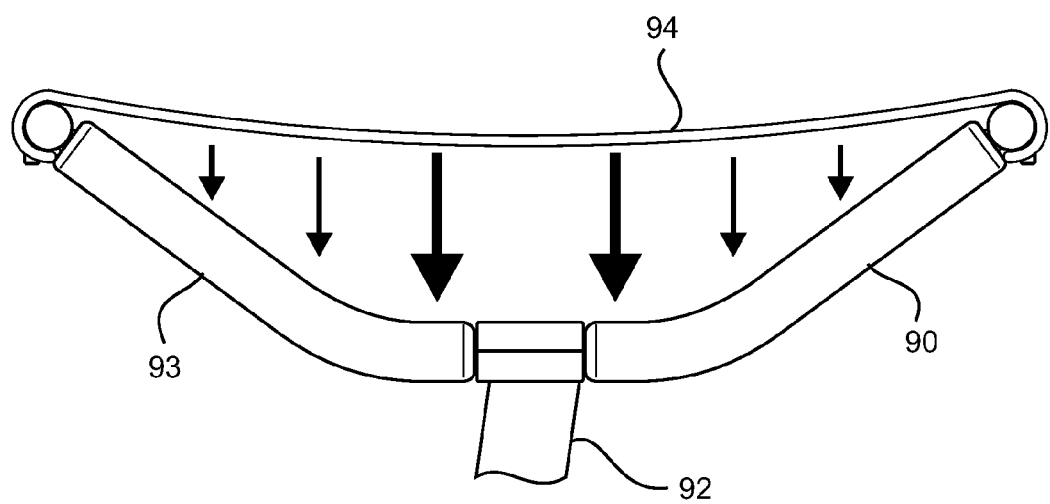
FIG. 10 shows downward forces indicated by arrows representing weight of a rider causing downward deformation of the suspended seat web/mesh causing increased tension forces in the seat web to react the rider's weight.

FIGS. 9 and 10 show the seat 90 in side view with the moulded web seat portion 94 mounted to a padded seat frame 93 on a seat stem 92. Arrows denote force applied to the web by weight of a rider. In FIG. 10 the force is sufficient to deflect the web downwards. Amount of deflection can be varied by controlling the Shore rating of the web, the number of webs and the dimensions of the frame and/or web(s) cross-sections.

Figure 11:
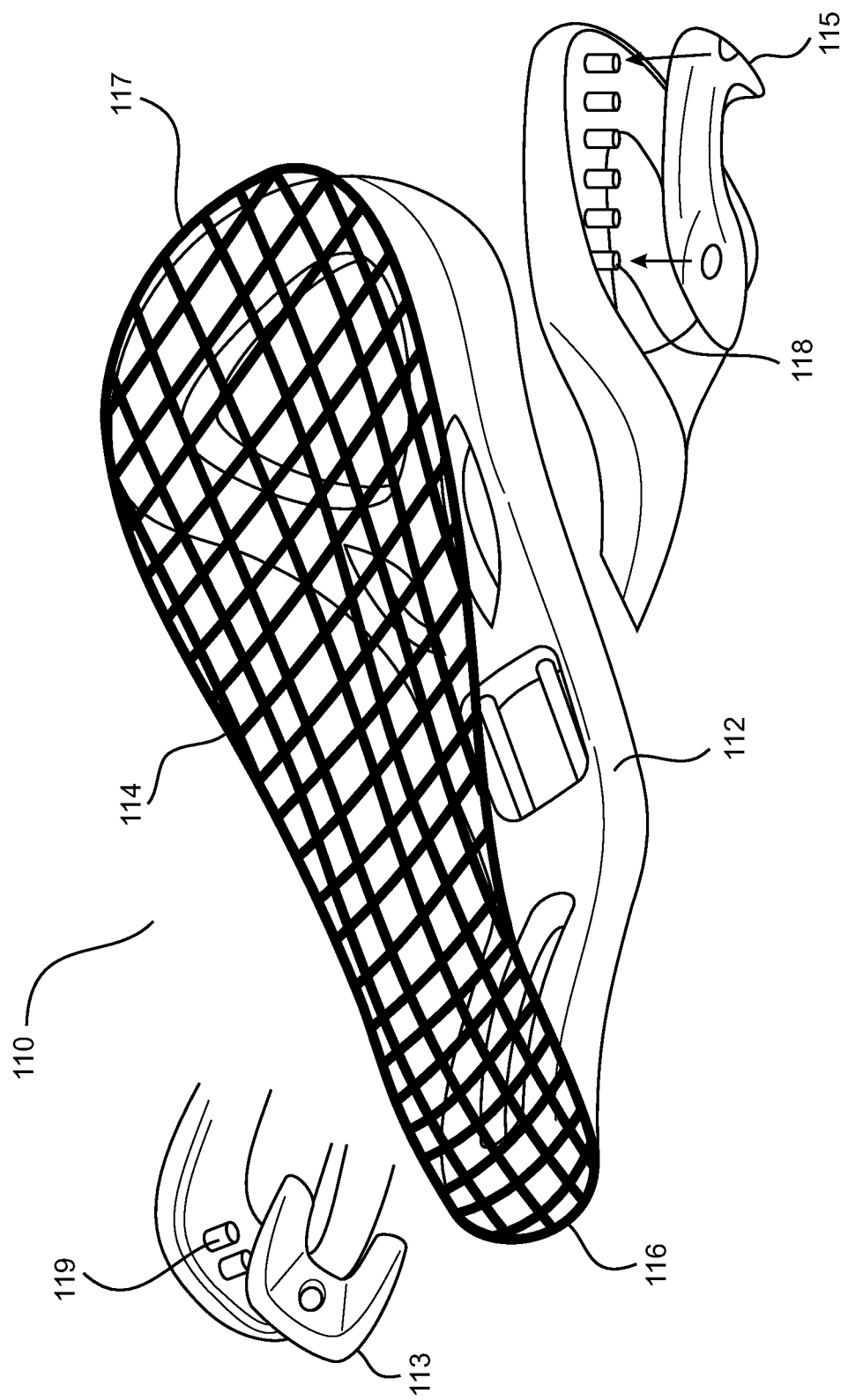
FIG. 11 shows an alternative embodiment of the present invention including an alternative form of attachment for the elastomer web seat portion to a seat frame for a bicycle.

FIG. 11 shows an alternative form of seat 110 according to an embodiment of the present invention. The centre view shows the seat in perspective. The left hand inset view shows the front end web mounting with its cover, and the right hand inset view shows the rear web mounting and its cover. A moulded elastomer web 114, preferably of moulded polyurethane, is mounted to a moulded seat frame 112. The rear mounting shows the projections 118 to receive the end loops 117 of the web. Likewise, the front view shows the front projections to receive the front loops 116 of the web. These projections at each end of the seat are underneath the end edges of the seat frame. Covers 113, 115 cover the front and rear projections respectively.

Figure 12:
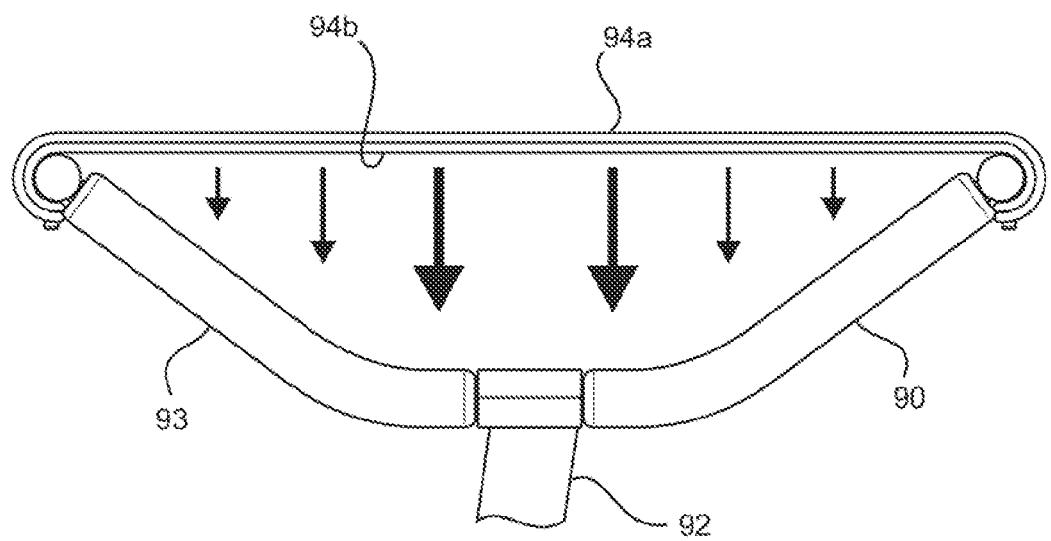
FIG. 12 shows initial downward forces indicated by arrows representing weight of a rider on the suspended seat comprising a multiple web/mesh arrangement.
Figure 13:
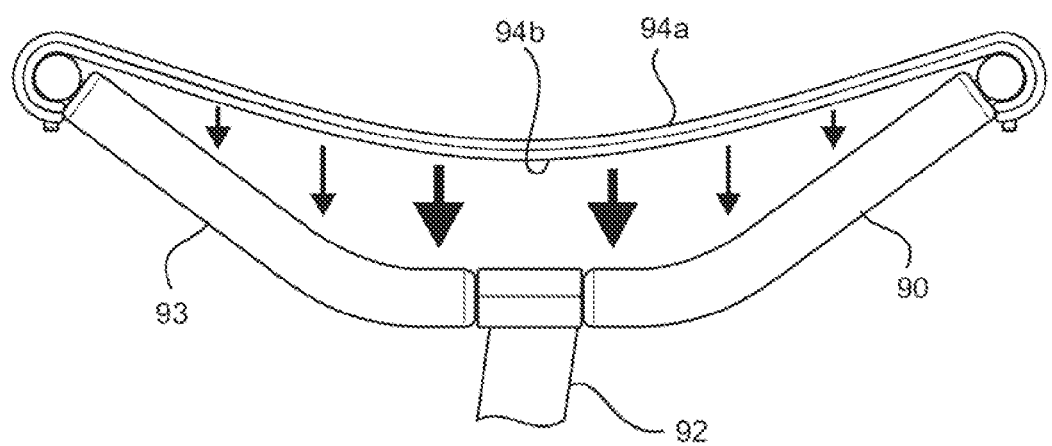
FIG. 13 shows downward forces indicated by arrows representing weight of a rider causing downward deformation of the suspended multiple seat web/mesh causing increased tension forces in the seat web to react the rider's weight.

FIGS. 12 and 13 show the seat 90 in side view with multiple moulded web seat portions 94a-94b mounted to a padded seat frame 93 on a seat stem 92. Arrows denote force applied to the web by weight of a rider. In FIG. 3, the force is sufficient to deflect the multiple webs downwards. As in previous embodiments described above, the amount of deflection of the multiple webs can be varied by controlling the Shore rating of the webs, the total number of webs and dimensions of the frame and/or web(s) cross-sections.

The invention claimed is:

1. A seat or saddle of a bicycle or ride on vehicle, the seat or saddle including at least one resilient elastomeric web seat portion having integrally formed respective front and rear web seat portion attachment means, the web seat portion being held in tension between respective front and rear seat frame attachment means of a seat frame by attachment of the integral front and rear seat portion attachment means to the respective front and rear frame attachment means, the tensioned at least one elastomeric web seat portion including a number of transversely spaced elastomer strands extending longitudinally between the integral front and rear seat portion attachment means, and transverse oriented stands transversely interconnecting the longitudinal strands at spaced intervals between the front and the rear seat portion attachment means, the tensioned at least one elastomeric web seat portion supporting a rider's effective weight on the seat or saddle, whereby the tensioned at least one elastomeric web seat portion resiliently stretches under said rider's effective weight with increasing reactive tension until the tension in the at least one elastomeric web seat portion balances the rider's effective weight and the rider is supported by the tensioned at least one elastomeric web seat portion within a concave space defined by the seat frame extending upwards to the front and the rear seat frame attachment means of the seat frame, the amount of deflection of the tensioned at least one web seat portion for a given rider's weight is predetermined by pre-selecting a Shore rating of the elastomer of the at least one web seat portion, the number of said web(s), the cross section of said web(s) and the dimensions of the seat frame.

2. A seat or saddle as claimed in claim 1, the at least one web seat portion has perforations or includes an open mesh or net.

3. A seat or saddle as claimed in claim 2, wherein the open mesh or net is formed as a regular polygon pattern mesh.

4. A seat or saddle as claimed in claim 1, wherein the at least one web seat portion includes a solid continuous web.

5. A seat or saddle as claimed in claim 1, wherein the elastomer is or includes urethane.

6. A seat or saddle as claimed in claim 1, wherein the elastomer has a durometer value of between 30 ShoreA and 120 ShoreA.

7. A seat or saddle as claimed in claim 6, wherein the durometer value is between 80 ShoreA and 95 ShoreA.

8. A seat or saddle as claimed in claim 1, including multiple said web seat portions suspended between the seat frame attachment means.

9. A seat or saddle as claimed in claim 8, wherein the multiple web seat portions are layered one over the other.

10. A seat or saddle as claimed in claim 1, wherein the at least one web seat portion includes zones with differing elastomeric characteristics.

11. A seat or saddle as claimed in claim 10, wherein the elastomer of a said web seat portion includes zones of differing Shore values.

12. A seat or saddle as claimed in claim 1, the elastomer being injection moulded or pour moulded.

13. A seat or saddle as claimed in claim 1, wherein the web seat portion attachment means includes the integral front or rear web seat portion attachment means formed by moulding the elastomer.

14. A seat or saddle as claimed in claim 1, being a cycle seat or saddle.

15. A cycle seat or saddle as claimed in claim 1, wherein front or rear, or front and rear, seat frame attachment means include(s) projections on the seat frame, and the respective front or rear, or front and rear, seat portion attachment means releasably attached by the web seat portion stretching over the respective projections on the seat frame.

* * * * *